(No Model.)

P. N. FRENCH.
SPRING.

No. 526,895.            Patented Oct. 2, 1894.

WITNESSES:
Darwin S. Wolcott
C. E. Hunt

INVENTOR,
Philo N. French
by George H. Christy
Att'y.

THE NORRIS PETERS CO., PHOTO-LITHO., WASHINGTON, D. C.

UNITED STATES PATENT OFFICE.

PHILO N. FRENCH, OF PITTSBURG, PENNSYLVANIA, ASSIGNOR TO THE A. FRENCH SPRING COMPANY, OF SAME PLACE.

SPRING.

SPECIFICATION forming part of Letters Patent No. 526,895, dated October 2, 1894.

Application filed January 5, 1894. Serial No. 495,770. (No model.)

*To all whom it may concern:*

Be it known that I, PHILO N. FRENCH, a citizen of the United States, residing at Pittsburg, in the county of Allegheny and State of Pennsylvania, have invented or discovered certain new and useful Improvements in Springs, of which improvements the following is a specification.

The invention described herein relates to certain improvements in elliptical springs, especially to that class or kind which is employed in railway locomotive and car construction. It has been heretofore customary to unite the two parts of an elliptical spring by forming eyes in the ends of the main leaves thereof, the eyes at the end of the main leaf of one part of the spring inclosing the eyes at the ends of the main leaf of the other part of the spring. These eyes are formed by a reverse curve from the general curvature of the main leaves, so that they form an abrupt shoulder at the ends of the operative portions of the main leaves against which the ends of the second leaves will abut when the springs are flattened. Hence, it is necessary to make the second leaves considerably shorter than the main leaves, so as to prevent a buckling of the second leaves by the abutting of their ends against the eyes of the main leaves when the spring is flattened. This construction is objectionable for the reason that portions of the main leaves are unsupported by the second leaves, and it is also objectionable on account of the injury to the metal due to the formation of the reverse curves in shaping the eyes at the ends of the main leaves.

The object of the present invention is to so construct the main leaves that the second leaves may overlap nearly the whole of the main leaves, or, at least, project beyond the bearing points on which the main leaves rest when in operation; and it is a further object of the invention to provide for the fastening of the two sections of the spring together without any weakening of the leaves thereof by the formation of reverse curves.

In general terms the invention consists in the construction and combination substantially as hereinafter more fully described and claimed.

Figure 1:
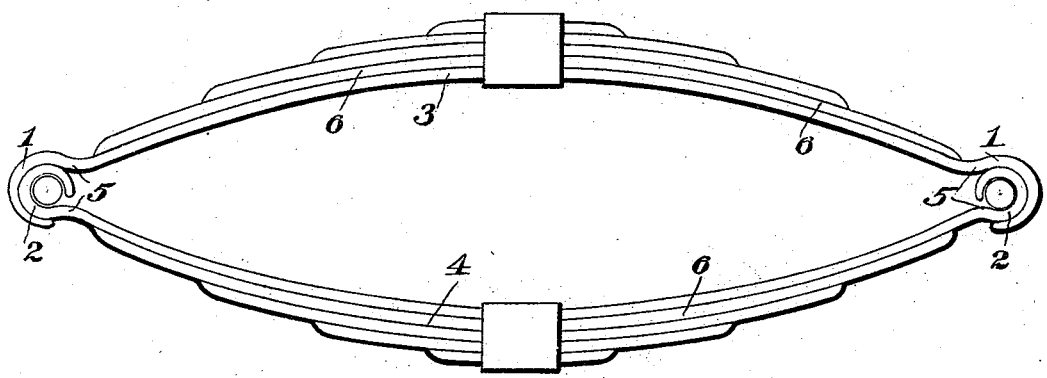
Figure 2:
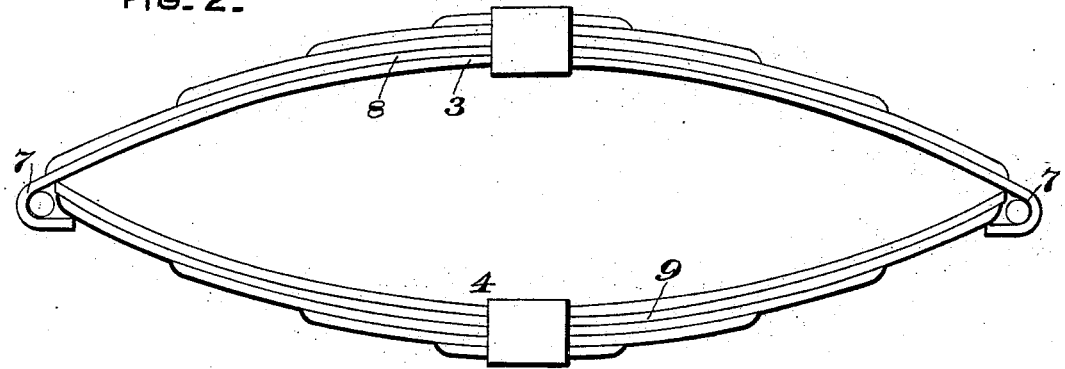

In the accompanying drawings forming a part of this specification, Figure 1 is a view in elevation of the form of spring now in general use, and Fig. 2 is a similar view of my improved elliptic spring.

As shown in Fig. 1, it has heretofore been customary to form eyes 1 and 2, at the ends of the main leaves 3 and 4, the eyes 1 of the main leaf 3 embracing the eyes 2 of the leaf 4. In forming these eyes, an abrupt bend is formed in each of the main leaves in a reverse direction from the general curvature thereof, as at 5, such abrupt bend or turn producing very injurious strains in the leaves, the strain being such that in the majority of cases the leaves are broken at those points. It will also be seen that in the formation of these eyes, a shoulder or abutment is formed against which the ends of the second leaves 6 will abut when the springs are flattened, unless such second leaves are made sufficiently short to prevent so great a movement at their ends. When this is done, the portions of the main leaves which are weakened by the formation of the eyes are left wholly unsupported except when an excessive weight or pressure is applied to the springs. In order to overcome these objectionable features, I form at the ends of one of the main leaves, preferably in the main leaf 3 of the upper section of the spring, loops 7, which are formed by a tangential bend somewhat sharper, but in the same direction as, the general curvature of the main leaf as distinguished from a reverse bend or curve. Within these loops are placed the ends of the first and second leaves of the other section of the spring, the ends of the first or main leaf 4 of said second section forming the bearing points for the other section.

It will be observed that as the holding loops 7 are curved in the same direction as, although on an arc of smaller radius than, the general curvature of the main leaf of the upper section, the second leaf 8 of the upper section can be extended to or beyond the points of bearing of the main leaf upon the ends of the main leaf 4 of the lower section, so that the main leaf of the upper section is always reinforced at the points of greatest strain by the second leaf, and may, if so desired, be further reinforced by the third and fourth leaves of such section. The loop 7 is made of sufficient depth to permit of the passage of bolts 9, connecting two or more sets of springs together when in use, between the ends of the leaves of the lower spring section and the ends of the loops. It will also be observed that the main leaf 4 of the lower section is reinforced to or nearly to its ends by the second leaf 9, and can be further reinforced, if necessary, by extending the third and fourth leaves so as to entirely overlap the main leaf.

It is characteristic of my improvement that the leaves are not subjected to any excessive or detrimental strains by the formation of reversed curves during their manufacture, and it is also characteristic that the several supplemental leaves, and by the term supplemental I intend to designate all leaves except the first or main leaves, can be extended so as to reinforce the main leaf at all points.

I claim herein as my invention—

1. In the construction of elliptic multiple leaf springs, the main or inner leaf of one half or section having its ends bent to form end loops in tangential, as distinguished from reverse curves, a second leaf the ends whereof brace or support the main leaf to or beyond the ends of the other half or section, and on account of the tangential bend in the main leaf is free to elongate on the main leaf when depressed in combination with a counter half section having a main leaf the ends of which are directly opposed to the added leaf of the first section and having also a second leaf which supports the main leaf to or approximately to the extreme end of its deflection and which is also free to elongate on the main leaf, substantially as set forth.

2. In the construction of elliptic multiple leaf springs, the main or inner leaf of one half or section having its ends bent to form end loops in tangential, as distinguished from reverse curves, a second leaf the ends whereof brace or support the main leaf to or beyond the ends of the other half or section and on account of the tangential bend in the main leaf is free to elongate on the main leaf when depressed in combination with a counter half section having a main leaf the ends of which are directly opposed to the added leaf of the first section and having also a second leaf which supports or braces the main leaf to or approximately to the extreme end of its deflection and which is also free to elongate on the main leaf, the ends of the main and supporting leaves of the second half or section being arranged within the loops at the ends of the first half or section, substantially as set forth.

In testimony whereof I have hereunto set my hand.

PHILO N. FRENCH.

Witnesses:
DARWIN S. WOLCOTT,
F. E. GAITHER.